(12) United States Patent  (10) Patent No.: US 8,366,319 B2
Kawasaki et al.  (45) Date of Patent: Feb. 5, 2013

(54) RADIATION DETECTION APPARATUS AND RADIOGRAPHIC APPARATUS

(75) Inventors: Yasuaki Kawasaki, Nasushiobara (JP); Katsuya Yamada, Kamakura (JP)

(73) Assignees: Kabushiki Kaisha Toshiba, Tokyo (JP); Toshiba Electron Tubes & Devices Co., Ltd., Tochigi-Ken (JP)

( * ) Notice: Subject to any disclaimer, the term of this patent is extended or adjusted under 35 U.S.C. 154(b) by 0 days.

(21) Appl. No.: 13/076,849

(22) Filed: Mar. 31, 2011

(65) Prior Publication Data

US 2011/0211673 A1 Sep. 1, 2011

Related U.S. Application Data

(63) Continuation of application No. PCT/JP2009/067276, filed on Oct. 2, 2009.

(30) Foreign Application Priority Data

Oct. 3, 2008 (JP) ................................ 2008-258353

(51) Int. Cl.
*G01N 23/04* (2006.01)
*H01J 31/50* (2006.01)

(52) U.S. Cl. .......................................... 378/189; 378/62

(58) Field of Classification Search .................... 378/62, 378/189; 250/370.11, 370.13, 370.15
See application file for complete search history.

(56) References Cited

U.S. PATENT DOCUMENTS 7,582,879 B2 * 9/2009 Abenaim et al. ......... 250/370.11
7,916,836 B2 * 3/2011 Tkaczyk et al. ............. 378/98.8
2007/0158574 A1 * 7/2007 Petrillo et al. ........... 250/370.13
2009/0121146 A1 * 5/2009 Luhta et al. .............. 250/370.11
2009/0152472 A1 * 6/2009 Kim et al. ................ 250/370.15

FOREIGN PATENT DOCUMENTS

| JP | 09-288184 | 11/1997 |
|----|-----------|---------|
| JP | 2000-116633 | 4/2000 |
| JP | 2000-258541 | 9/2000 |
| JP | 2004-219318 | 8/2004 |
| JP | 2005-148008 | 6/2005 |
| JP | 2005-283262 | 10/2005 |
| JP | 2007-101273 | 4/2007 |
| JP | 2008-229194 | 10/2008 |

OTHER PUBLICATIONS

International Search Report for PCT/JP2009/067276.

* cited by examiner

*Primary Examiner* — Irakli Kiknadze
(74) *Attorney, Agent, or Firm* — Pillsbury Winthrop Shaw Pittman, LLP (57) ABSTRACT

According to one embodiment, a radiation detection apparatus includes a radiation detection panel, a support member that is configured to support the radiation detection panel on one surface thereof and has electrical conductive property, a circuit board that is supported on the other surface of the support member, a flexible circuit board configured to electrically connect the radiation detection panel to the circuit board, a heat insulation member arranged between the radiation detection panel and the circuit board, a housing that is configured to accommodate the radiation detection panel, the circuit board, the support member, and the heat insulation member and has electrical conductive property, and a heat conduction member that is accommodated in the housing, connected to the support member and the housing, and configured to achieve electrical conduction between the support member and the housing to conduct heat of the support member to the housing.

11 Claims, 9 Drawing Sheets

RADIATION DETECTION APPARATUS AND RADIOGRAPHIC APPARATUS

CROSS-REFERENCE TO RELATED APPLICATIONS

This is a Continuation Application of PCT Application No. PCT/JP2009/067276, filed Oct. 2, 2009, which was published under PCT Article 21(2) in Japanese.

This application is based upon and claims the benefit of priority from Japanese Patent Application No. 2008-258353, filed Oct. 3, 2008; the entire contents of which are incorporated herein by reference.

FIELD

Embodiments described herein relate generally to a radiation detection apparatus and a radiographic apparatus.

BACKGROUND

An X-ray detection apparatus that detects a radiation, especially an X-ray has been conventionally utilized in a wide field, such as an industrial nondestructive test, medical diagnostics, or scientific research such as structural analysis.

Among X-ray detection apparatuses, a high-sensitivity and a high-definition X-ray detection apparatus provided with an X-ray detection panel having a photodetector and a fluorescent layer has been known. The photodetector has a photoelectric conversion element section in which a plurality of photosensors and a plurality of thin-film transistors (TFTs) are two-dimensionally arranged. The fluorescent layer is directly formed on the photodetector. The fluorescent layer converts an X-ray into light that can be detected by the photoelectric conversion element section.

The X-ray detection panel is supported on one surface of a plate-shaped support member. A circuit board is supported on the other surface of the support member. The circuit board drives the X-ray detection panel. The X-ray detection panel and the circuit board are electrically connected to each other through a flexible circuit board.

When the X-ray detection apparatus is actuated, the circuit board generates heat. A part of the generated heat is radiated into air in a housing of the X-ray detection apparatus. However, a major part of the heat moves to a member having a lower temperature based on heat conduction.

Therefore, the heat generated in the circuit board is conducted to the support member that supports the circuit board. Further, the heat conducted to the support member is conducted to the X-ray detection panel having a lower temperature.

When the heat is conducted to the X-ray detection panel, a temperature of the X-ray detection panel increases, and an operation temperature becomes a high temperature. Then, a dark current of the photoelectric conversion element and a leak current of the TFTs increase and an amount of fixed noise fluctuates, which results in a problem causing unevenness in an image.

A calorific value of the circuit board is not uniform even when taking a partial view. The heat conductive property of the circuit board is not uniform even when taking a partial view either. Therefore, partial unevenness occurs in the temperature of the X-ray detection panel. Thus, in the X-ray detection panel, values of the dark current and the leak current partially fluctuate, and the fixed noise partially varies.

In regard to this problem, a method of cooling the circuit board or the X-ray detection panel by using a cooling device has been suggested (see, e.g., Jpn. Pat. Appln. KOkAI Publication No. 2005-283262 (page 6, FIGS. 1 to 2)). As the cooling device, although there is a cooler adopting a natural radiational cooling system, a peltier element or a cold-water circulation device is used in order to obtain sufficient cooling performance.

Further, a method of energizing the X-ray detection apparatus 24 hours before use to make uniform a variation of the leak current has been also suggested.

DETAILED DESCRIPTION

In general, according to one embodiment, there is provided a radiation detection apparatus comprising a radiation detection panel configured to detect a radiation, a support member that is configured to support the radiation detection panel on one surface thereof and has electrical conductive property, a circuit board that is supported on the other surface of the support member and configured to drive the radiation detection panel, a flexible circuit board configured to electrically connect the radiation detection panel to the circuit board, a heat insulation member arranged between the radiation detection panel and the circuit board, a housing that is configured to accommodate the radiation detection panel, the circuit board, the support member, and the heat insulation member and has electrical conductive property, and a heat conduction member that is accommodated in the housing, connected to the support member and the housing, and configured to achieve electrical conduction between the support member and the housing to conduct heat of the support member to the housing.

According to another embodiment, there is provided a radiation detection apparatus comprising a radiation detection panel configured to detect a radiation, a support member that is configured to support the radiation detection panel on one surface thereof and has electrical conductive property, a circuit board that is supported on the other surface of the support member and configured to drive the radiation detection panel, a flexible circuit board configured to electrically connect the radiation detection panel to the circuit board, a heat insulation member arranged between the radiation detection panel and the circuit board, a housing that is configured to accommodate the radiation detection panel, the circuit board, the support member, and the heat insulation member and has electrical conductive property, a heat conduction member that is accommodated in the housing, connected to the support member and the housing, and configured to achieve electrical conduction between the support member and the housing to conduct heat of the support member to the housing, and a frame-shaped partition member that is provided between the radiation detection panel and the housing, partitions a space into a first space surrounded by the housing and the support member and a second space surrounded by the radiation detection panel and the entrance window, and suppresses entrance and exit of an atmosphere between the first space and the second space.

According to another embodiment, there is provided a radiation detection apparatus comprising a first heat insulation space and a second heat insulation space, wherein the first heat insulation space comprises a radiation detection panel configured to detect a radiation, a heat insulation member arranged between the radiation detection panel and a circuit board, and an entrance window arranged opposite to the radiation detection panel with a gap, and the second heat insulation space comprises a support member that is configured to support the radiation detection panel on one surface thereof and has electrical conductive property, a circuit board that is supported on the other surface of the support member and configured to drive the radiation detection panel, a housing having electrical conductive property, and a heat conduction member that is accommodated in the housing and connected to the support member and the housing, and the first heat insulation space and the second heat insulation space are thermally insulated by a heat insulation member arranged between the radiation detection panel and the circuit board.

According to another embodiment, there is provided a radiographic apparatus comprising a radiation irradiation unit configured to irradiate a radiation, and a radiation detection apparatus, wherein the radiation detection apparatus comprises a radiation detection panel configured to detect a radiation, a support member that is configured to support the radiation detection panel on one surface thereof and has electrical conductive property, a circuit board that is supported on the other surface of the support member and configured to drive the radiation detection panel, a flexible circuit board configured to electrically connect the radiation detection panel to the circuit board, a heat insulation member arranged between the radiation detection panel and the circuit board, a housing that is configured to accommodate the radiation detection panel, the circuit board, the support member, and the heat insulation member and has electrical conductive property, and a heat conduction member that is accommodated in the housing, connected to the support member and the housing, and configured to achieve electrical conduction between the support member and the housing to conduct heat of the support member to the housing.

According to another embodiment, there is provided a radiographic apparatus comprising a radiation irradiation unit configured to irradiate a radiation, and a radiation detection apparatus, wherein the radiation detection apparatus comprises a radiation detection panel configured to detect a radiation, a support member that is configured to support the radiation detection panel on one surface thereof and has electrical conductive property, a circuit board that is supported on the other surface of the support member and configured to drive the radiation detection panel, a flexible circuit board configured to electrically connect the radiation detection panel to the circuit board, a heat insulation member arranged between the radiation detection panel and the circuit board, a housing that is configured to accommodate the radiation detection panel, the circuit board, the support member, and the heat insulation member and has electrical conductive property, a heat conduction member that is accommodated in the housing, connected to the support member and the housing, and configured to achieve electrical conduction between the support member and the housing to conduct heat of the support member to the housing, and a frame-shaped partition member that is provided between the radiation detection panel and the housing, partitions a space into a first space surrounded by the housing and the support member and a second space surrounded by the radiation detection panel and a entrance window, and suppresses entrance and exit of an atmosphere between the first space and the second space.

One embodiment will be described with reference to the drawings appended hereto. The embodiment discloses a roentgenographic apparatus as a radiographic apparatus.

Figure 1:
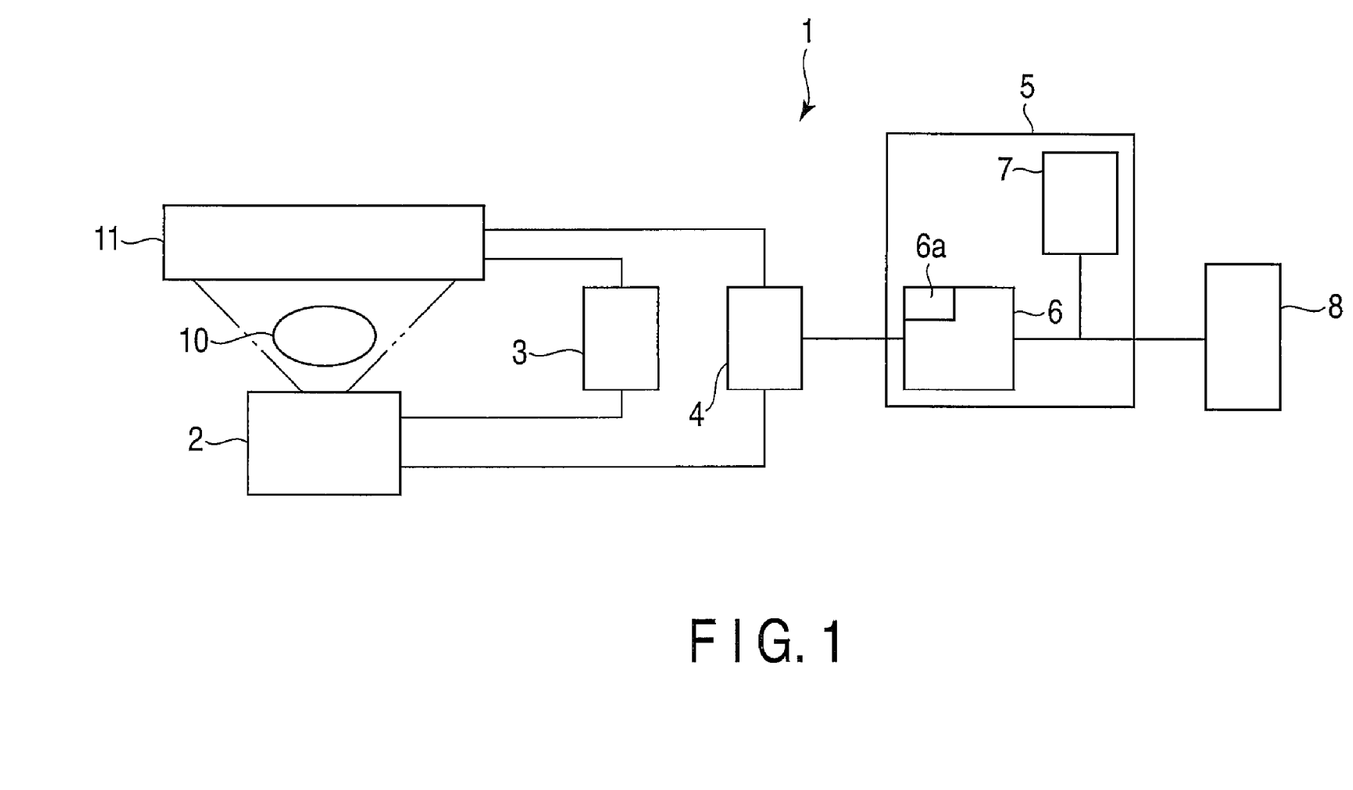
FIG. 1 is a schematic block diagram showing a roentgenographic apparatus according to an embodiment.

FIG. 1 is a schematic block diagram showing a roentgenographic apparatus 1.

As shown in FIG. 1, the roentgenographic apparatus 1 comprises an X-ray irradiation unit 2 that irradiats an X-ray as a radiation irradiation unit that irradiats a radiation ray, an X-ray detection apparatus 11 as a radiation detection apparatus, a power supply unit 3, a control unit 4, a personal computer (PC) 5, and a monitor 8.

The X-ray detection apparatus 11 is configured to detect an X-ray image formed when an X-ray is irradiated from the X-ray irradiation unit 2 enters through a subject 10, generate an analog signal indicative of the X-ray image, and convert the analog signal into a digital signal. It is to be noted that, although described later, the X-ray detection apparatus 11 can form a background image without incidence of the X-ray, generate an analog signal indicative of the background image, and convert the analog signal into a digital signal.

The power supply unit 3 is configured to supply electric power to the X-ray irradiation unit 2 and the X-ray detection apparatus 11. The control unit 4 is configured to control activation or drive of the X-ray irradiation unit 2 and the X-ray detection apparatus 11. Further, the control unit 4 is configured to acquire a digital signal indicative of an X-ray image and a digital signal indicative of a background image from the X-ray detection apparatus 11.

The PC 5 includes an image processing unit 6 and a storage medium 7. The image processing unit 6 can acquire the digital signal indicative of an X-ray image and the digital signal indicative of a background image formed by the X-ray detection apparatus 11 through the control unit 4. The image processing unit 6 has a memory 6a that stores the digital signal indicative of a background image.

The image processing unit 6 is configured to execute subtraction processing of subtracting the digital signal indicative of a background image from the digital image indicative of an X-ray image. As a result, the image processing unit 6 can form a digital signal indicative of a normal image associated with a dosage of X-rays that enter the X-ray detection apparatus 11.

The storage medium 7 is configured to store the digital signal indicative of a normal image. It is to be noted that the roentgenographic apparatus 1 may be formed to enable storing the digital signal indicative of a background image and the digital signal indicative of an X-ray image in the storage medium 7.

To the monitor 8 is input the digital signal indicative of a normal image formed by the image processing unit 6 or the digital signal indicative of a normal image stored in the storage medium 7. As a result, the monitor 8 can display the normal image.

The X-ray detection apparatus 11 will now be described in detail.

Figure 2:
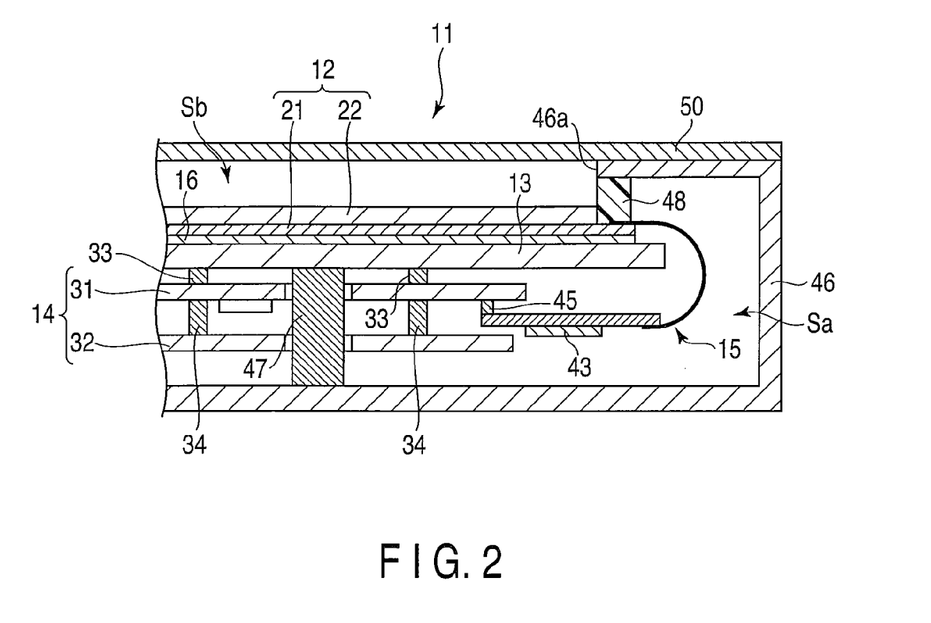
FIG. 2 is a sectional view showing a part of an X-ray detection apparatus depicted in FIG. 1.

FIG. 2 is a sectional view showing a part of the X-ray detection apparatus.

The X-ray detection apparatus 11 comprises an X-ray-detection panel 12 as a radiation detection panel, a plate-shaped support member 13, a circuit board group 14, a flexible circuit board 15, a heat insulation member 16, a housing 46, and a heat conduction member 47.

The support member 13 supports the X-ray detection panel 12 on one surface thereof. The support member 13 has electrical conductive property. The circuit board group 14 is supported on the other surface of the support member 13 and electrically drives the X-ray detection panel 12. The flexible circuit board 15 electrically connects the X-ray detection panel 12 with the circuit board group 14. The heat insulation member 16 is arranged between the X-ray detection panel 12 and the circuit board group 14.

The housing 46 accommodates the X-ray detection panel 12, the support member 13, the circuit board group 14, the flexible circuit board 15, the heat insulation member 16, and the heat conduction member 47. The housing 46 has electrical conductive property. The housing 46 has an opening 46a formed at a position facing the X-ray detection panel 12.

A plurality of spacers 33 are connected with an analog circuit board 31 and the support member 13 and have electrical conductive property and heat conductive property. A plurality of spacers 34 are connected with the analog circuit board 31 and a digital circuit board 32 and have electrical conductive property and heat conductive property. The spacers 33 and the spacers 34 are stacked on multiple stages.

The analog circuit board 31 is electrically and thermally connected to the support member 13 through the spacers 33. The digital circuit board 32 is electrically and thermally connected to the support member 13 through the spacers 34, the analog circuit 31, and the spacers 33. It is to be noted that the spacers 33 and the spacers 34 may be integrally formed and directly connected to the digital circuit board 32.

Therefore, the analog circuit board 31, the digital circuit board 32, and the support member 13 can have the same reference potential, Moreover, heat generated in the circuit board group 14 (the analog circuit board 31, the digital circuit board 32, and others) can be conducted to the support member 13. It is to be noted that the heat conducted from the circuit board group 14 to the support member 13 is transferred as heat radiation and thermal hydraulics besides the heat conduction.

A heat conduction member 47 is connected to the support member 13 and the housing 46. The heat conduction member 47 runs through an opening of the analog circuit board 31 and an opening of the digital circuit board 32. It is to be noted that the heat conduction member 47 may run through a part where the analog circuit board 31 and the digital circuit board are not arranged.

The heat conduction member 47 achieves electrical conduction between the support member 13 and the housing 46. The heat conduction member 47 has the heat conductive property. The heat conduction member 47 conducts heat of the support member 13 to the housing 46.

As described above, the circuit board group 14 and the housing 46 are electrically and thermally connected to each other. The circuit board group 14, the support member 13, and the housing 46 have the same reference potential. Therefore, noise contamination with respect to a signal (a detection signal) of the circuit board group 14, which may possibly occur when the reference potential of the circuit board group 14 is different from the potential of the housing 46, can be suppressed.

Heat generated in the circuit board group 14 is conducted to the housing 46 as heat conduction, heat radiation, or thermal hydraulics through the heat conduction member 47 and others. Therefore, the heat generated in the circuit board group 14 can be released to the outside of the housing 46.

Further, in this embodiment, the heat conduction member 47 is implanted in the support member 13. Therefore, a thickness of the support member 13 can be reduced, thereby achieving weight saving. It is to be noted that means for connecting the heat conduction member 47 to the support member 13 can be modified in many ways, and these members may be connected by, e.g., welding.

Figure 3:
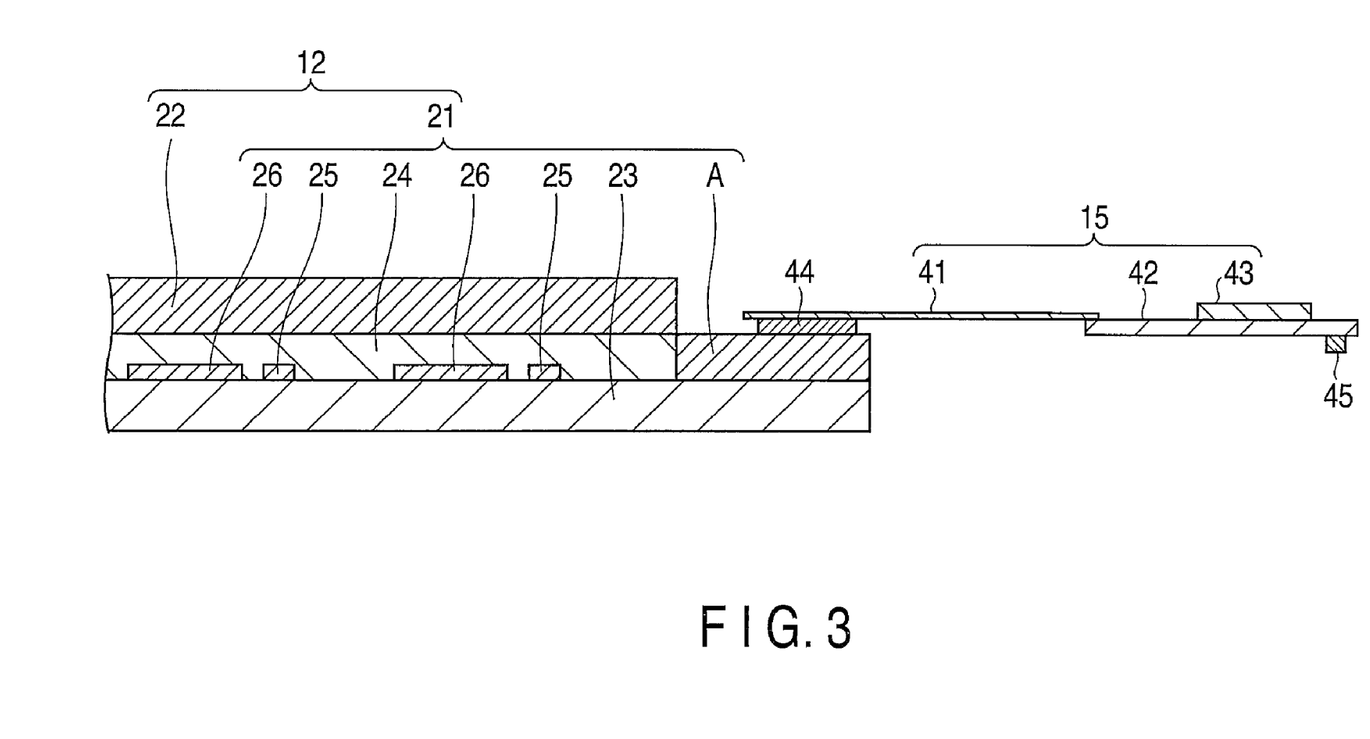
FIG. 3 is a sectional view showing a part of an X-ray detection panel and a flexible circuit board in FIG. 2 in a developed manner.
Figure 4:
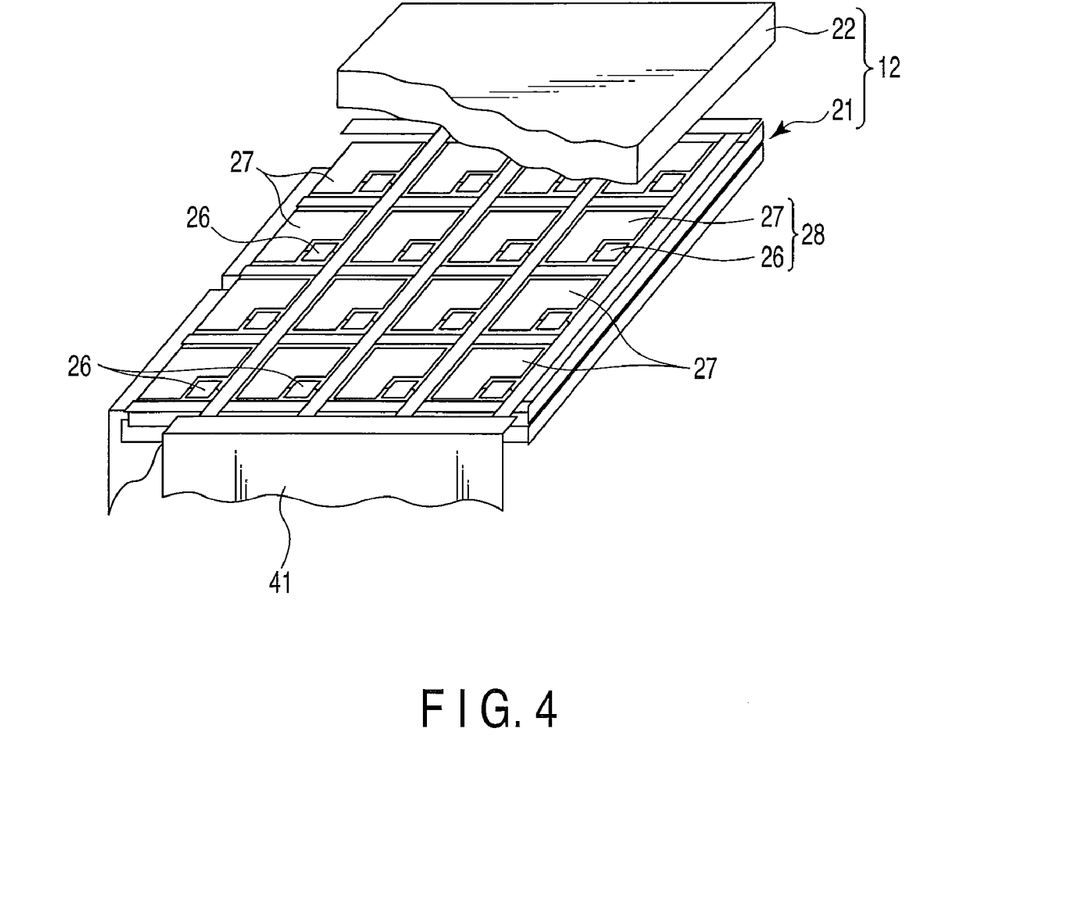
FIG. 4 is an exploded perspective view showing a part of the X-ray detection apparatus and the partially cutaway X-ray detection panel.

As shown in FIG. 2, FIG. 3, and FIG. 4, the X-ray detection panel 12 has a photodetector 21 and a fluorescent layer 22 directly formed on the photodetector 21. The fluorescent layer 22 is placed on an X-ray incidence side of the photodetector 21. The fluorescent layer 22 is configured to convert an X-ray into light that can be detected by the photodetector 21.

The photodetector 21 has a glass substrate 23, a plurality of wiring portions 25, a plurality of thin-film transistors (TFTs) 26, a charge fetch section (an electrode pad section) A, and a photosensor 24. The photosensor 24 has a plurality of photodiodes 27.

Photoelectric conversion element sections 28 are two-dimensionally formed on the glass substrate 23. In detail, the photoelectric conversion element sections 28 are formed on the glass substrate 23 in a matrix form. Each photoelectric conversion section 28 is formed of the photodiode 27 and the TFT 26. The photodiode 27 converts light converted by the fluorescent layer 22 into an electrical signal. The electrical signal converted by the photodiode 27 is supplied to the TFT 26.

The wiring portions 25 are formed on the glass substrate 23 and connected to the TFTs 26. The charge fetch section A is formed at an outer peripheral portion of the glass substrate 23. The charge fetch section A is connected to the wiring portions 25.

The circuit board group 14 includes a non-illustrated control board, an analog circuit board 31, a digital circuit board 32, a non-illustrated power supply circuit board, and others. The control board is configured to control the X-ray detection panel. The analog circuit board 31 has at least one of a function of receiving an analog signal from the flexible circuit board 15, a function of processing this signal, and a function of converting this signal into a digital signal.

The digital circuit board 32 has at least one of a function of controlling the other board and a function of communicating with the outside of the X-ray detection apparatus 11. The power supply circuit board is configured to supply electric power to the other boards.

The circuit board group 14 is supported being apart from the other surface of the support member 13 through the plurality of spacers 33 and the plurality of spacers 34.

The flexible circuit board 15 includes a flexible board 41, an IC-mounted board 42 connected to one end of the flexible board 41, and a detection integrated circuit 43. The detection integrated circuit 43 is mounted on the IC-mounted board 42. The other end of the flexible board 41 is arranged on the charge fetch section A of the X-ray detection panel 12 through an anisotropic conductive adhesive 44. A connector 45 is provided at one end of the IC-mounted board 42. The IC-mounted board 42 is connected to the analog circuit board 31 through the connector 45.

Furthermore, as the heat insulation member 16, a resin-based material or a fiber-based material having excellent heat insulation property can be used. The heat insulation member 16 is arranged between the X-ray detection panel 12 and the circuit board group 14. In this embodiment, the heat insulation member 16 is sandwiched and held between the x-ray detection panel 12 and the support member 13. The heat insulation member 16 is bonded to the X-ray detection panel 12 and the support member 13 by a non-illustrated adhesive or double-faced tape. The heat insulation member 16 has antielectricity characteristics. The heat insulation member 16 is formed into a plate shaped and has a thickness of 1 to 5 mm.

An entrance window 50 is disposed to the outside of the housing 46. The entrance window 50 is formed of carbon fiber reinforced plastic (CFRP). The entrance window 50 is arranged opposite to the X-ray detection panel 12 with a gap therebetween. The entrance window 50 overlaps the opening 46a to be connected to the housing 46. Since the entrance window 50 allows an X-ray to pass therethrough, the X-ray passes through the entrance window 50 to enter the X-ray detection panel 12.

A thermoplastic resin member 48 as a partition member is provided between the X-ray detection panel 12 and the housing 46. The thermoplastic resin member 48 joins and connects the outer peripheral portion of the X-ray detection panel 12 and the housing 46 to each other. In this embodiment, the thermoplastic resin member 48 is integrally formed into a frame-shaped without being divided. It is to be noted that the thermoplastic resin member 48 may be formed of a plurality of divided segment portions.

The thermoplastic resin member 48 divides a space into a first space Sa and a second space Sb. The first space Sa is a space surrounded by the thermoplastic resin member 48, the housing 46, and the support member 13. The second space Sb is a space surrounded by the thermoplastic resin member 48, the X-ray detection panel 12, and the entrance window 50. The thermoplastic resin member 48 is configured to suppress entrance and exit of an atmosphere (air) between the first space Sa and the second space Sb. In this embodiment, the thermoplastic resin member 48 isolates to prevent the atmosphere (the air) from entering and exiting between the first pace Sa and the second space Sb.

Figure 5:
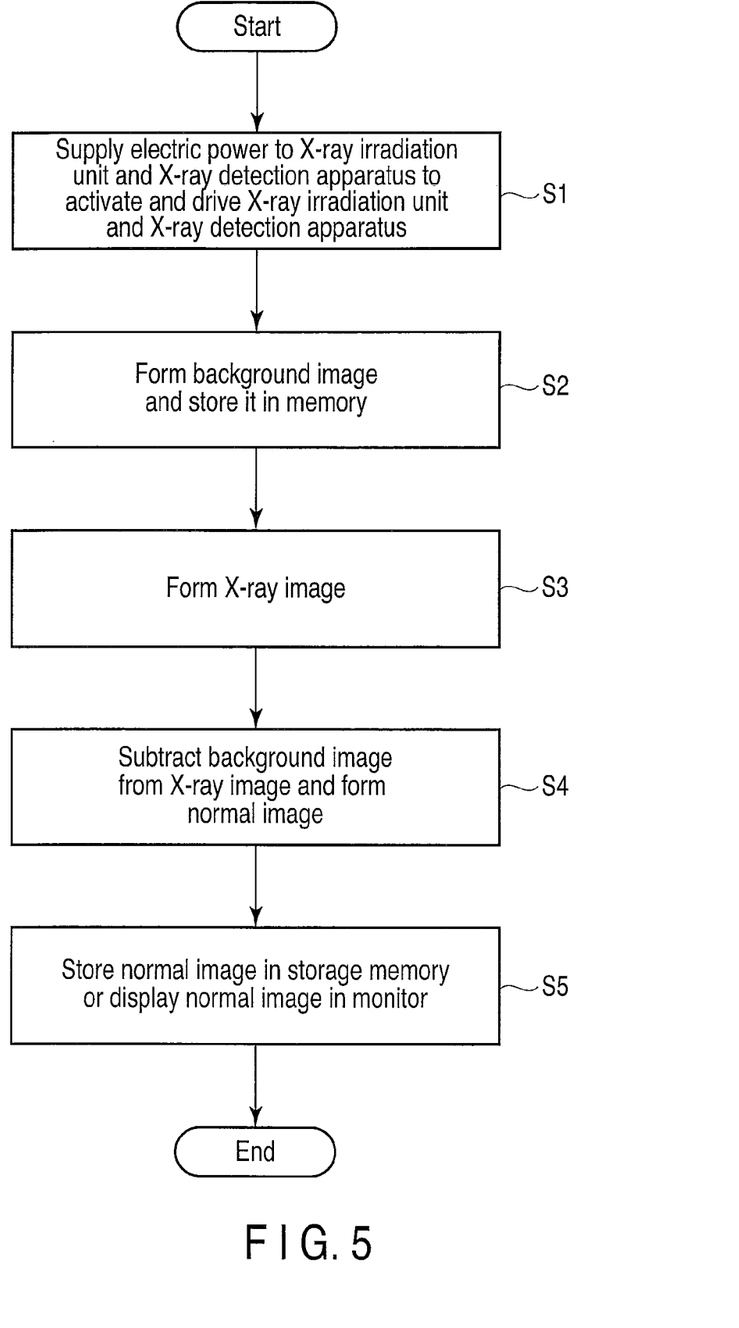
FIG. 5 is a flowchart showing a roentgenographic method for a subject using the roentgenographic apparatus.

A roentgenographic method of roentgenographing the subject 10 by using the thus configured roentgenographic apparatus 1 will now be described. FIG. 5 is a flowchart showing the roentgenographic method for the subject 10 using the roentgenographic apparatus 1.

As shown in FIG. 1 to FIG. 5, when the roentgenographic method for the subject 10 starts, at a step S1, the power supply unit 3 first supplies electric power to the X-ray irradiation unit 2 and the X-ray detection apparatus 11, and the control unit 4 activates and drives the X-ray irradiation unit 2 and the X-ray detection apparatus 11.

At a step S2, the control unit 4 allows the X-ray detection apparatus 11 to form a background image without irradiating X-rays from the X-ray irradiation unit 2. The background image is an image generated by using a dark current generated in each photoelectric conversion element 27 in accordance with a temperature of the X-ray detection panel, a value of a leak current generated in each TFT 26, and a signal including an offset voltage of the analog circuit board 31.

If the dark currents generated in the plurality of photoelectric conversion elements 27 and the leak currents generated in the TFTs 26 are uneven, the background image becomes uneven.

In detail, at the step S2, the X-ray detection panel 12 forms the background image without incidence of the x-rays and generates an analog signal indicative of the background image. The analog signal indicative of the background image is converted into a digital signal by the circuit board group 14, and the converted signal is transmitted to the image processing unit 6 via the control unit 4. It is to be noted that, when converting into the digital signal by the circuit board group 14, the analog signal is converted into a plurality of bits. The image processing unit 6 acquires the digital signal indicative of the background image and stores the digital signal indicative of the background image in the memory 6a.

Figure 6:
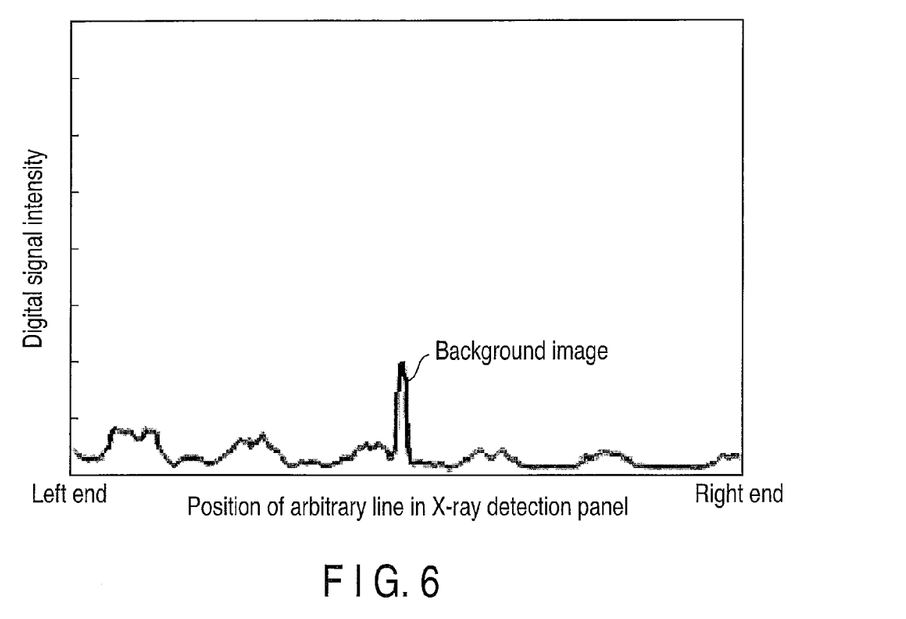
FIG. 6 is an explanatory view showing a background image detected by the X-ray detection panel in the X-ray detection apparatus in the form of a graph, where the background image is an image generated by a signal containing a dark current of each photoelectric conversion element, a leak current of each TFT, and an offset voltage of an analog circuit.

As shown in FIG. 6, a signal level of the background image acquired by the image processing unit 6 becomes uneven due to unevenness in element characteristics of the X-ray detection panel, unevenness in temperature, and others. That is, an intensity of the digital signal becomes uneven depending on a position in the X-ray' detection panel 12.

Figure 7:
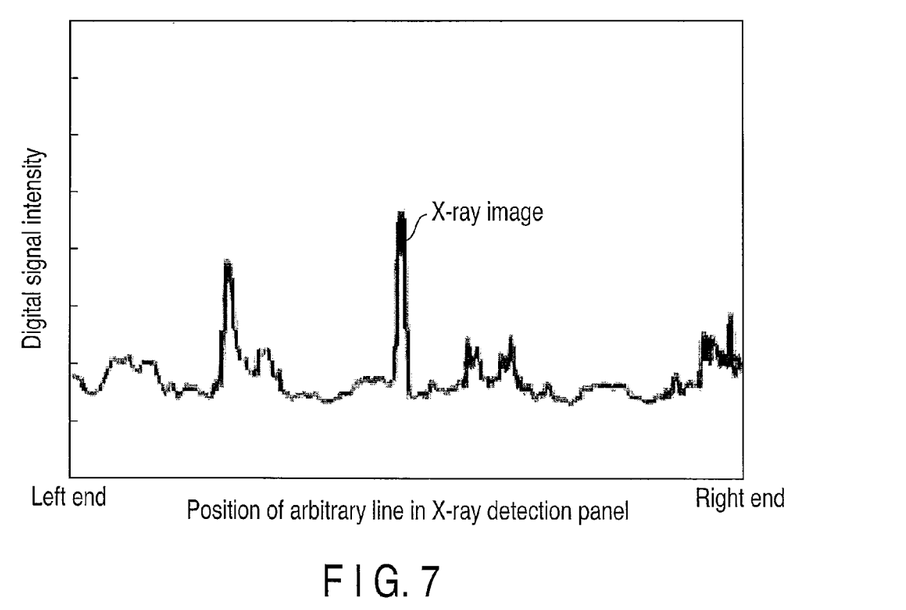
FIG. 7 is an explanatory view showing an X-ray image detected by the X-ray detection panel in the X-ray detection apparatus in the form of a graph.
Figure 8:
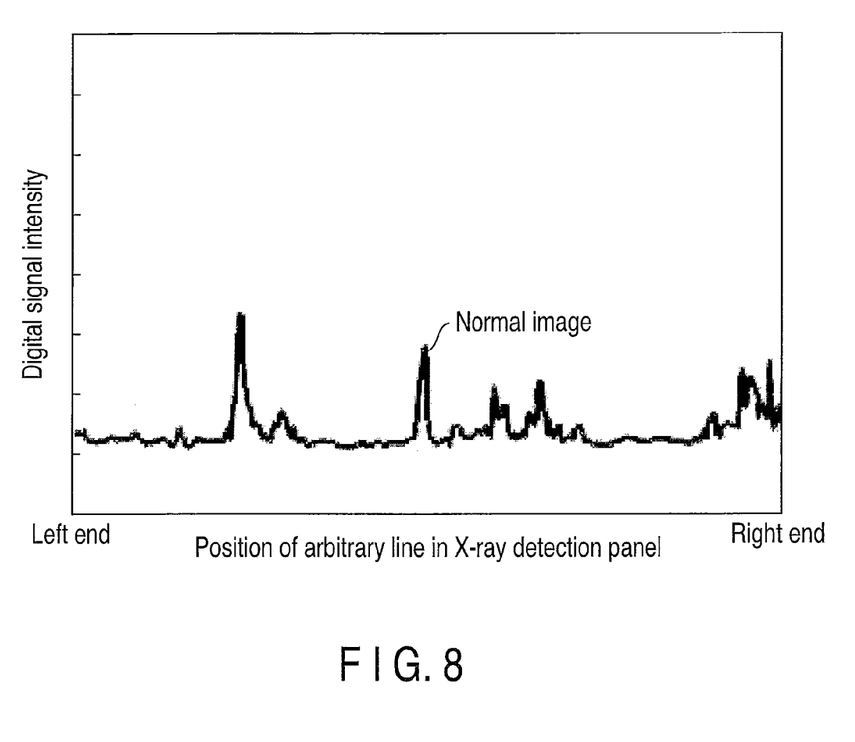
FIG. 8 is an explanatory view showing a normal image obtained by deducing the background image from the X-ray image in the form of a graph.

It is to be noted that an X-ray image in each of FIG. 6 to FIG. 8 is data fundamentally having a planar distribution, but it will be one-dimensionally represented and explained here.

As shown in FIG. 1 to FIG. 5, at a step S3, when the X-ray irradiated from the X-ray irradiation unit 2 passes through the subject 10 to enter the X-ray detection apparatus 11, the control unit 4 forms an X-ray image in the X-ray detection apparatus 11.

In detail, at the step S3, when the X-ray having passed through the subject 10 enters the X-ray detection panel 12, the X-ray detection panel 12 forms an X-ray image and generates an analog signal indicative of the X-ray image. The analog signal indicative of the X-ray image is converted into a digital signal by the circuit board group 14, and the converted signal is transmitted to the image processing unit 6 through the control unit 4.

As shown in FIG. 7, the X-ray image acquired by the image processing unit 6 corresponds to a sum of a component of the background image and a signal component associated with an incident X-ray dosage. Therefore, the X-ray image contains the signal component of the background image. Accordingly, even if X-rays with a uniform radiation dosage enter the entire X-ray detection panel 12, image unevenness remains.

As shown in FIG. 1 to FIG. 5, at a step S4, the image processing unit 6 executes subtraction processing of subtracting the digital signal indicative of the background image stored in the memory 6a from the acquired digital signal indicative of the X-ray image. As a result, the image processing unit 6 can form a digital signal indicative of a normal image associated with the incident X-ray dosage for the X-ray detection apparatus 11 alone.

As shown in FIG. 8, since the normal image formed by the image processing unit 6 does not contain the component of the background image, unevenness in signal level caused due to unevenness in element characteristics and unevenness in temperature of the X-ray detection panel, and the like can be eliminated.

As shown in FIG. 1 to FIG. 5, at a step S5, the digital signal indicative of the normal image formed by the image processing unit 6 is stored in the storage medium 7. Alternatively, the digital signal indicative of the normal image formed by the image processing unit 6 is input to the monitor 8 to display the normal image in the monitor 8, thereby terminating the roentgenographic method for the subject 10.

Here, the present inventors examined a change in temperature of the X-ray detection panel 12 with respect to an activation time of the X-ray detection apparatus 11. Additionally, as a comparative example, they also examined a change in temperature of the X-ray detection panel 12 with respect to an activation time of an X-ray detection apparatus formed without providing the heat insulation member 16 and the heat conduction member 47.

Figure 9:
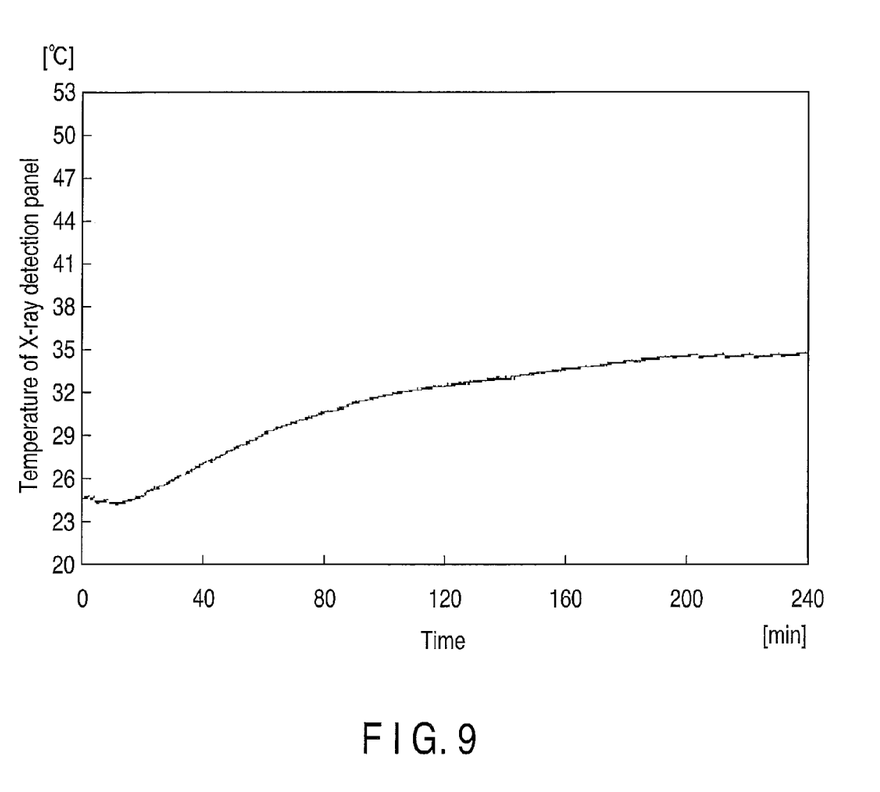
FIG. 9 is a view showing a change in temperature of the X-ray detection panel with respect to an activation time of the X-ray detection apparatus in the form of a graph.
Figure 10:
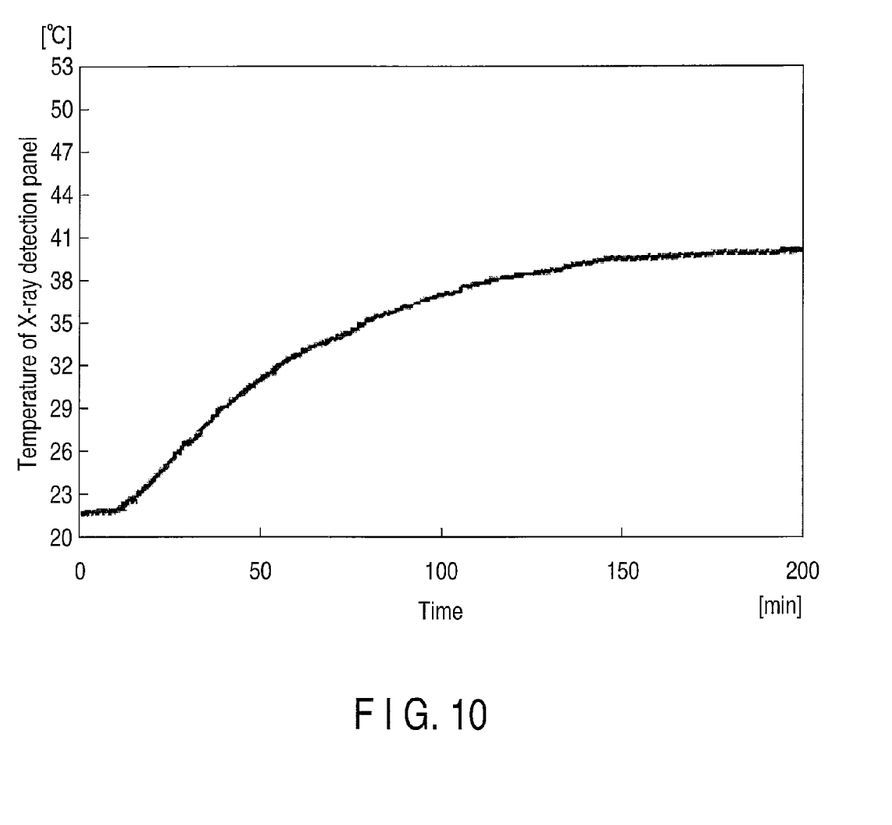
FIG. 10 is a view showing a change in temperature of the X-ray detection panel with respect to an activation time of the X-ray detection apparatus as a comparative example of the X-ray detection apparatus in the form of a graph.

FIG. 9 shows a result of examining a change in temperature of the X-ray detection panel 12 with respect to an activation time of the X-ray detection apparatus 11 according to this embodiment. FIG. 10 shows a result of examining a change in temperature of the X-ray detection panel 12 with respect to an activation time of the X-ray detection apparatus as the comparative example.

As shown in FIG. 9, the temperature of the entire X-ray detection panel 12 was low, and a saturation temperature was also approximately 35° C., which is not greater than 40° C. Therefore, it can be understood that the dark current generated in each photoelectric conversion element 27 and the leak current generated in each TFT 26 can be suppressed.

A change in temperature of the X-ray detection panel 12 is not greater than 0.13° C./min when 20 minutes elapse after turning on the power supply, and hence this change is gentle. That is, the change in temperature of the X-ray detection panel 12 is not greater than 0.13° C./min within 20 minutes after turning on the power supply. Therefore, since each interval for executing the subtraction processing (image correction) can be prolonged, an X-ray continuous irradiation period can be increased.

When 20 minutes elapse from activation of the X-ray detection apparatus 11, a change in temperature of the X-ray detection panel 12 is not greater than 0.13° C./rain, and a correction error after the subtraction processing can be suppressed, thus sufficiently obtaining an effect of the subtraction processing. Therefore, after 20 minutes from the activation of the X-ray detection apparatus 11, the subject 10 can be excellently roentgenographed.

On the other hand, as shown in FIG. 10, in the X-ray detection apparatus according to the comparative example, a temperature of the entire X-ray detection panel 12 was high, and consequently a saturation temperature exceeded 40° C. Therefore, suppressing the leak current generated in the X-ray detection panel 12 is difficult. In particular, when the temperature of the X-ray detection panel 12 exceeds 40° C., the dark current generated in each photoelectric conversion element 27 or the leak current generated in each TFT precipitously increases, the leak current greatly fluctuates. In this case, it can be considered that a correction error after the subtraction processing cannot be suppressed even if the subtraction processing is executed, and the effect of the subtraction processing cannot be obtained.

Further, it can be also considered that, even though the effect of the subtraction processing can be obtained, since a change in temperature of the X-ray detection panel 12 is large, each interval for execution of the subtraction processing (image correction) must be shortened, and the X-ray continuous irradiation period cannot be prolonged.

Although not shown, after 20 minutes from the activation of the X-ray detection apparatus, a change in temperature of each TFT was large, and consequently it exceeded 0.13° C./min. Therefore, it can be considered that the subject 10 cannot be excellently roentgenographed immediately after the activation of the X-ray detection apparatus 11.

In other words, the X-ray detection apparatus 11 has a first heat insulation space and a second heat insulation space. The first heat insulation space and the second heat insulation space are thermally insulated by the heat insulation member 16 arranged between these spaces. The first heat insulation space includes the X-ray detection panel 12, the heat insulation member 16, and the entrance window 50. The second heat insulation space includes the support member 13, any circuit board in the circuit board group 14, the housing 46, and the heat conduction member 47.

As described above, according to the roentgenographic apparatus 1 in this embodiment, the X-ray detection apparatus 11 comprises the X-ray detection panel 12, the support member 13, any circuit board in the circuit board group 14, the flexible circuit board 15, the heat conduction member 47, and the heat insulation member 16.

When the X-ray detection apparatus 11 is actuated, heat is generated from the circuit board group 14 arranged on a back surface side of the X-ray detection panel 12. A part of the heat generated from the circuit board group 14 is transferred to air in the housing 46. However, a major part of the heat generated from the circuit board group 14 is conducted to a member having a lower temperature as heat conduction.

Therefore, the heat generated from the circuit board group 14 is conducted to the support member 13 through the spacers 33 and 34 or the air. In an X-ray detection apparatus having a conventional configuration, the heat conducted to the support member 13 is conducted to the X-ray detection panel 12 having a lower temperature.

However, in the X-ray detection apparatus 11 according to this embodiment, the heat insulation member 16 is arranged between the X-ray detection panel 12 and the support member 13. The heat insulation member 16 can increase thermal resistance between the X-ray detection panel 12 and the circuit board group 14. The heat insulation member 16 can thermally isolate the X-ray detection panel 12 and the circuit board group 14 from each other. Therefore, the conduction of the heat generated in the circuit board group 14 from the support member 13 to the X-ray detection panel 12 can be reduced.

The X-ray detection apparatus 11 comprises the heat conduction member 47. Therefore, the heat conducted to the support member 13 can be conducted to the housing 46 through the heat conduction member 47 having smaller thermal resistance. It is to be noted that the heat transferred to the housing 46 can be released to the outside air by a cooling mechanism arranged on the outer surface of the housing 46.

Furthermore, the heat transferred to the air in the housing 46 is circulated in the housing 46. However, the thermoplastic resin member 48 can prevent the air from being circulated between the first space Sa in which the circuit board group 14 is placed and the second space Sb in which the X-ray detection panel 12 is placed.

Therefore, an increase in operation temperature of the X-ray detection panel 12 due to the heat generated in the circuit board group 14 can be reduced without using the cooling device, thereby suppressing occurrence of image unevenness.

In particular, the heat insulation member 16 is formed into a plate-shaped and has a thickness of 1 to 5 mm. A change in temperature of the X-ray detection panel 12 becomes 0.13° C./min or below within 20 minutes after turning on the power supply. Since a fluctuation in temperature of the X-ray detection panel 12 becomes gentle by the heat insulation member 16, occurrence of the image unevenness can be suppressed by image processing of the image processing unit 6. Moreover, since the heat insulation member 16 is sandwiched and held between the X-ray detection panel 12 and the support member 13, the heat conducted to the support member 13 can be assuredly reduced from being conducted to the X-ray detection panel 12.

The heat conduction member 16 has the antielectricity characteristics. It can suppress occurrence of static electricity when assembling the X-ray detection panel 12 (fixing the X-ray detection panel 12).

The support member 13 has the electrical conductive property. Therefore, it can make uniform the reference potentials of the respective circuit boards.

The housing 46 has the electrical conductive property. The spacers 33 and 34, the support member 13, and the heat conduction member 47 achieve electrical conduction between the circuit board group 14 and the housing 46. Therefore, the reference potential of the housing and the reference potential of the circuit board can be made uniform, noise produced due to a small reference potential difference can be suppressed, thus acquiring a normal image with less noise.

With the above-described configuration, the X-ray detection apparatus and the roentgenographic apparatus comprising the X-ray detection apparatus that can reduce a thermal influence exerted on the X-ray detection panel by the circuit board without using the cooling device can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the heat insulation member 16 may be arranged between the support member 13 and the circuit board group 14. Even in this case, the heat conduction from the circuit board group 14 to the support member 13 can be suppressed. Therefore, it is possible to reduce an increase in operation temperature of the x-ray detection panel 12 caused due to the heat generated in the circuit board group 14.

The X-ray detection panel is not restricted to an indirect conversion type X-ray detection panel that converts an X-ray into light and then converts the light into an electrical signal, and even a direct conversion type X-ray detection panel that directly converts an X-ray into an electrical signal can obtain the above-described effect.

The present invention is not limited to the X-ray detection apparatus and the roentgenographic apparatus, and it can be applied to various kinds of X-ray detection apparatuses and roentgenographic apparatuses. FIG. 1 shows an example of a schematic configuration of the roentgenographic apparatus. Not only the image processing unit 6 but also software can execute the image processing. The image processing may be performed by the control unit 4 or the PC 5. The image processing may be effected by the circuit board group 14 too.

Further, the present invention can be applied to a radiation detection apparatus and a radiographic apparatus.

What is claimed is:

1. A radiation detection apparatus comprising:
    a radiation detection panel configured to detect a radiation;
    a support member that is configured to support the radiation detection panel on one surface thereof and has electrical conductive property;
    a circuit board that is supported on the other surface of the support member and configured to drive the radiation detection panel;
    a flexible circuit board configured to electrically connect the radiation detection panel to the circuit board;
    a heat insulation member arranged between the radiation detection panel and the circuit board;
    a housing that is configured to accommodate the radiation detection panel, the circuit board, the support member, and the heat insulation member and has electrical conductive property; and
    a heat conduction member that is accommodated in the housing, connected to the support member and the housing, and configured to achieve electrical conduction between the support member and the housing to conduct heat of the support member to the housing.

2. The radiation detection apparatus according to claim 1, wherein the heat insulation member is sandwiched between the radiation detection panel and the support member.

3. The radiation detection apparatus according to claim 1, wherein the heat insulation member has antielectricity characteristics.

4. The radiation detection apparatus according to claim 1, further comprising:
    an entrance window which is arranged opposite to the radiation detection panel with a gap and connected to the housing and through which a radiation passes; and
    a frame-shaped partition member provided between the radiation detection panel and the housing,
    wherein the housing has an opening that overlaps the entrance window, and
    the partition member partitions a space into a first space surrounded by the housing and the support member and a second space surrounded by the radiation detection panel and the entrance window to suppress entrance and exit of an atmosphere between the first space and the second space.

5. The radiation detection apparatus according to claim 1, wherein the heat insulation member is formed into a plate-shaped and has a thickness of 1 to 5 mm.

6. The radiation detection apparatus according to claim 1, further comprising
    a spacer that is connected to the circuit board and the support member, has electrical conductive property, and conducts heat generated in the circuits substrate to the support member.

7. A radiation detection apparatus comprising:
    a radiation detection panel configured to detect a radiation;
    a support member that is configured to support the radiation detection panel on one surface thereof and has electrical conductive property;
    a circuit board that is supported on the other surface of the support member and configured to drive the radiation detection panel;
    a flexible circuit board configured to electrically connect the radiation detection panel to the circuit board;
    a heat insulation member arranged between the radiation detection panel and the circuit board;
    a housing that is configured to accommodate the radiation detection panel, the circuit board, the support member, and the heat insulation member and has electrical conductive property;
    a heat conduction member that is accommodated in the housing, connected to the support member and the housing, and configured to achieve electrical conduction between the support member and the housing to conduct heat of the support member to the housing; and
    a frame-shaped partition member that is provided between the radiation detection panel and the housing, partitions a space into a first space surrounded by the housing and the support member and a second space surrounded by the radiation detection panel and the entrance window, and suppresses entrance and exit of an atmosphere between the first space and the second space.

8. A radiation detection apparatus comprising a first heat insulation space and a second heat insulation space,
wherein the first heat insulation space comprises:
a radiation detection panel configured to detect a radiation;
a heat insulation member arranged between the radiation detection panel and a circuit board; and
an entrance window arranged opposite to the radiation detection panel with a gap, and
wherein the second heat insulation space comprises:
a support member that is configured to support the radiation detection panel on one surface thereof and has electrical conductive property;
a circuit board that is supported on the other surface of the support member and configured to drive the radiation detection panel;
a housing having electrical conductive property; and
a heat conduction member that is accommodated in the housing and connected to the support member and the housing, and
wherein the first heat insulation space and the second heat insulation space are thermally insulated by the heat insulation member.

9. A radiographic apparatus comprising:
a radiation irradiation unit configured to irradiate a radiation; and
a radiation detection apparatus, wherein the radiation detection apparatus comprises:
a radiation detection panel configured to detect a radiation;
a support member that is configured to support the radiation detection panel on one surface thereof and has electrical conductive property;
a circuit board that is supported on the other surface of the support member and configured to drive the radiation detection panel;
a, flexible circuit board configured to electrically connect the radiation detection panel to the circuit board;
a heat insulation member arranged between the radiation detection panel and the circuit board;
a housing that is configured to accommodate the radiation detection panel, the circuit board, the support member, and the heat insulation member and has electrical conductive property; and
a heat conduction member that is accommodated in the housing, connected to the support member and the housing, and configured to achieve electrical conduction between the support member and the housing to conduct heat of the support member to the housing.

10. The apparatus according to claim 9, further comprising an image processing unit that is configured to acquire a radiation image formed by the radiation detection apparatus, acquires a background image formed by the radiation detection apparatus without incidence of a radiation, acquires a radiation image formed when a radiation irradiated from the radiation irradiation unit passes through a subject to enter the radiation detection apparatus, executes subtraction processing of subtracting the background image from the radiation image, and forms a normal image associated with a dosage of the radiation entering the radiation detection apparatus alone.

11. A radiographic apparatus comprising:
a radiation irradiation unit configured to irradiate a radiation; and
a radiation detection apparatus,
wherein the radiation detection apparatus comprises:
a radiation detection panel configured to detect a radiation;
a support member that is configured to support the radiation detection panel on one surface thereof and has electrical conductive property;
a circuit board that is supported on the other surface of the support member and configured to drive the radiation detection panel;
a flexible circuit board configured to electrically connect the radiation detection panel to the circuit board; a heat insulation member arranged between the radiation detection panel and the circuit board;
a housing that is configured to accommodate the radiation detection panel, the circuit board, the support member, and the heat insulation member and has electrical conductive property;
a heat conduction member that is accommodated in the housing, connected to the support member and the housing, and configured to achieve electrical conduction between the support member and the housing to conduct heat of the support member to the housing; and
a frame-shaped partition member that is provided between the radiation detection panel and the housing, partitions a space into a first space surrounded by the housing and the support member and a second space surrounded by the radiation detection panel and a entrance window, and suppresses entrance and exit of an atmosphere between the first space and the second space.

* * * * *